United States Patent
Jiang

(10) Patent No.: US 6,282,804 B1
(45) Date of Patent: Sep. 4, 2001

(54) CONTINUOUS MONITORING INCLINATION SENSOR

(75) Inventor: Shusheng Jiang, Mesa, AZ (US)

(73) Assignee: Nanotron, Inc, Tempe, AZ (US)

( * ) Notice: Subject to any disclaimer, the term of this patent is extended or adjusted under 35 U.S.C. 154(b) by 0 days.

(21) Appl. No.: 09/432,973

(22) Filed: Nov. 3, 1999

(51) Int. Cl.[7] .............................. G01C 9/06; G01C 9/18
(52) U.S. Cl. ................................... 33/366.21; 33/366.26
(58) Field of Search .......................... 33/366.11, 366.15, 33/366.21, 366.26

(56) References Cited

U.S. PATENT DOCUMENTS

| | | |
|---|---|---|
| 3,786,472 * | 1/1974 | Scopacasa ........................ 33/366.12 |
| 4,028,260 | 6/1977 | Zuest . |
| 4,167,818 | 9/1979 | Cantarella . |
| 4,536,967 | 8/1985 | Beitzer . |
| 4,641,434 | 2/1987 | Engler . |
| 4,672,753 | 6/1987 | Kent . |
| 4,866,850 | 9/1989 | Kelly . |
| 4,937,518 | 6/1990 | Donati . |
| 5,031,329 | 7/1991 | Smallidge . |
| 5,159,761 | 11/1992 | Cagan . |
| 5,279,040 | 1/1994 | Kippelt . |
| 5,625,955 | 5/1997 | Han . |
| 5,852,878 * | 12/1998 | Seipp, Jr. et al. ................ 33/366.11 |
| 6,032,376 * | 3/2000 | Shijo et al. ...................... 33/366.21 |
| 6,123,866 * | 9/2000 | Shijo .............................. 33/366.21 |

OTHER PUBLICATIONS

The Fredericks Company (catalog r–200–10) "Electrolytic Tilt Sensors" (no date).

* cited by examiner

Primary Examiner—G. Bradley Bennett
(74) Attorney, Agent, or Firm—Howard R. Popper

(57) ABSTRACT

A arcuate resistive sensor element is imprinted upon a ceramic substrate forming a wall of a ceramic body in which an electrolyte, advantageously silver nitrate dissolved in a mixture of methanol, water and butanol, is sealed. To avoid the effects of electroplating, an AC exciting voltage is applied between the ends of the sensor element which is bridged by a discharge resistor whose resistance is much lower than the internal resistance of the sensor element so as to dissipate any polarization caused by asymmetry of the voltage supply. A signal output is taken from a midpoint of the sensor element which is always immersed in the electrolyte so that the effect of any leakage current is minimized. Linearity of output with change in the tilt angle achieved with an illustrative embodiment has been measured at better than 99.9% in tilt angle range of −50 to +50 degrees.

10 Claims, 4 Drawing Sheets

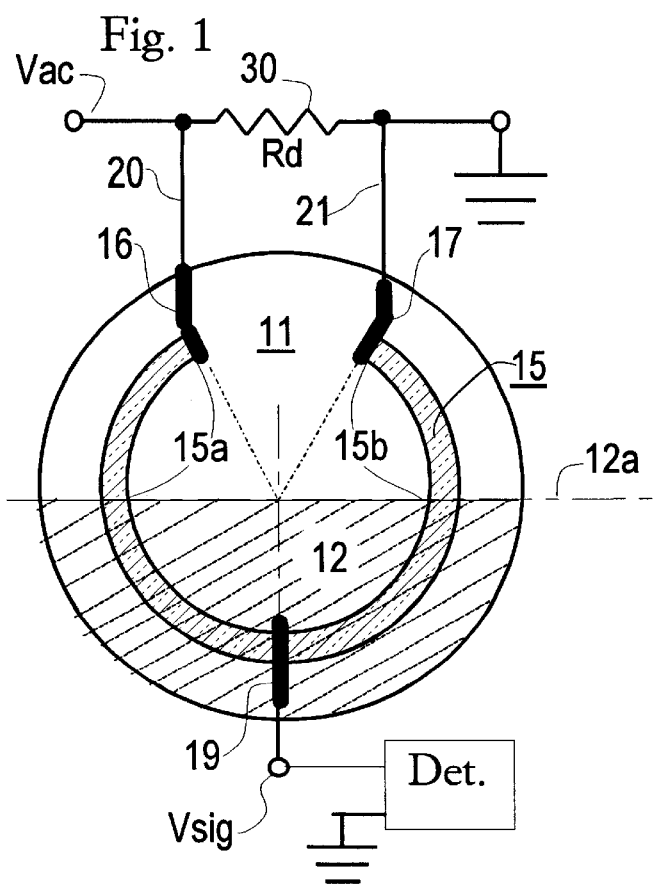
Fig. 1
Fig. 2
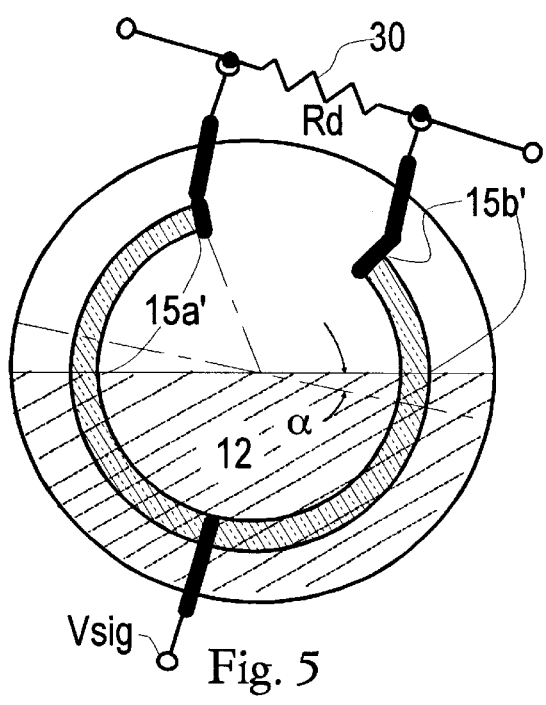
Fig. 5
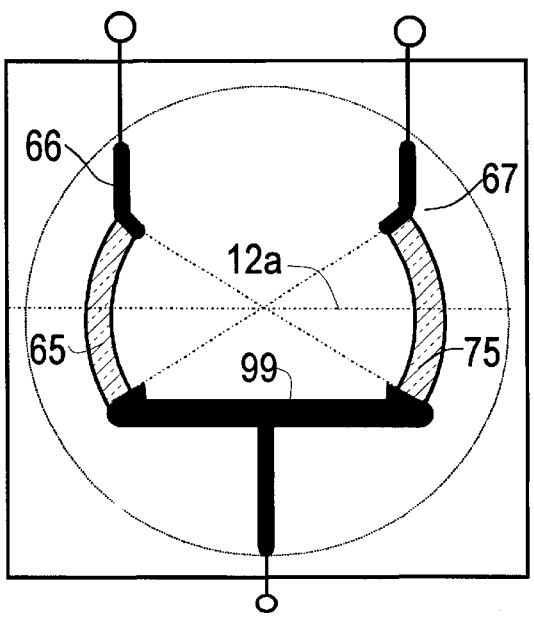
Fig. 6

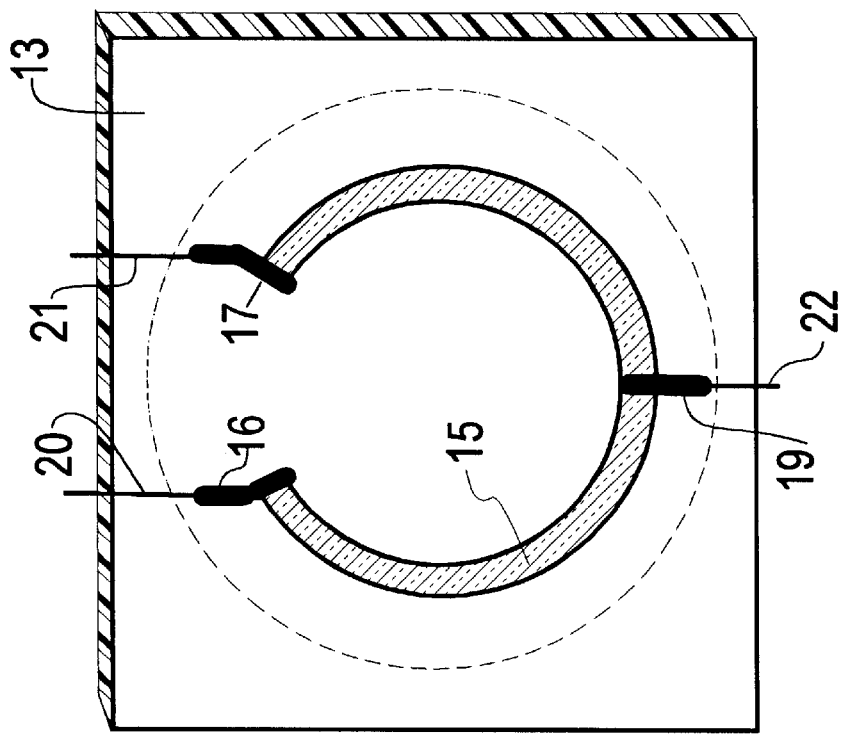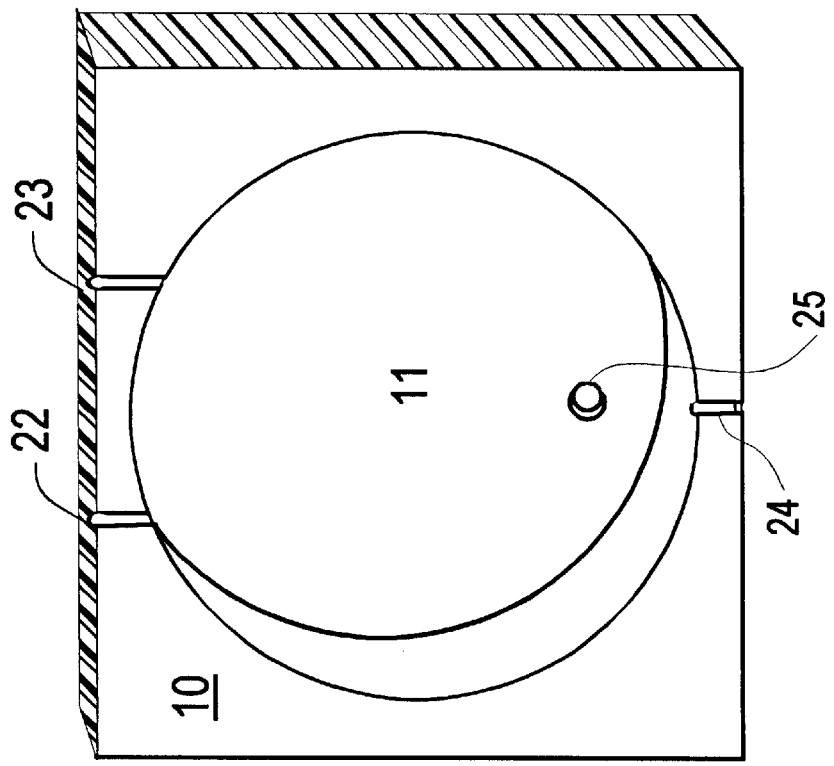

CONTINUOUS MONITORING INCLINATION SENSOR

FIELD OF THE INVENTION

This invention relates to the measurement of angular inclination or tilt and, more particularly, to the continuous monitoring of changes in angular position of a spirit medium partially filling an enclosed space.

BACKGROUND OF THE PRIOR ART

The spirit level is a familiar tool in which the position of an air bubble within a curved glass tube partially filled with a liquid indicates whether the tool is level or not. This principle has given rise to many different embodiments such as one disclosed in Scopacasa, U.S. Pat. No. 3,786,472. There, a toroid chamber is used which is half-filled with mercury. Pairs of electrodes are spaced around the periphery of the chamber. Contact between the mercury and variously situated electrodes as the chamber is inclined corresponds to predetermined angles of displacement. Cantarella U.S. Pat. No. 4,167,818 and Kent patent U.S. Pat. No. 4,672,753 both employ arcuate resistance elements which are variably submerged in a conductive liquid as the housing is tilted. The Cantarella patent applies a DC or AC potential between the resistance sectors and uses a bridge connected to circular hoop which is always in contact with the liquid to measure the change in resistance caused by the liquid wetting different parts of the sectors as the housing is tilted. Beitzer patent U.S. Pat. No. 4,536,967 provides a thermal shunt about the glass tube and accurate spacing and symmetry of the electrodes to minimize the effect of changes in fluid temperature on its resistivity.

Donati U.S. Pat. No. 4,937,518 uses methylene diglycol as a conductive liquid which partially fills a chamber formed between two spaced-apart ceramic plates. Each plate bears a pair of imprinted palladium electrodes in the shape of semi-circular segments arranged with their respective cordal edges facing each other and with their curved edges lying on the same imaginary circumference. The liquid forms a resistive electrical connection between the electrodes which varies in accordance with the position of the liquid.

The problem with the above described devices employing fluid electrolytes is that they tend to suffer from both leakage currents and electroplating of their sensing elements. Leakage currents are possible in certain embodiments because of surface adsorption of the electrolyte. Leakage current causes non-linearity, especially a thigh tilt angles. Asymmetry in the exciting AC voltage that is necessary in order to measure the change in resistance occasioned by movement of the sensing elements with respect to the liquid may cause electroplating of the sensing elements, as may accidental exposure to DC voltage. Electroplating of the sensing elements over time brings a battery effect into a tilt sensor and degrades the linearity of angular measurement and scale factor which, in some cases, can be noticeable even after a very short period of operation.

Some prior art devices have employed curved glass tubes in order to achieve a linear response to change in tilt angle. Such devices must be carefully fabricated to provide arcuate sectors which form portions of a perfect circle and are therefore quite costly. Those devices which employ mercury as the conductive liquid tend to be insensitive to small changes in angular rotation because of mercury's tendency to roll erratically and suffer also from the polluting effects of mercury's high vapor pressure.

On the other hand, those devices employing conventional electrolytes in ceramic instead of glass structures suffer, in addition to the battery effect, from surface absorption of the electrolyte by the porous ceramic surface which gives rise to surface leakage currents which degrade the linearity.

SUMMARY OF THE INVENTION

The problems of these prior art devices are alleviated in accordance with the principles of the present invention in an illustrative embodiment in which an arcuate resistive sensor element is imprinted upon a ceramic substrate forming a wall of a ceramic body in which an electrolyte, advantageously silver nitrate dissolved in a mixture of methanol, water, and butanol, is sealed. To avoid the effects of electroplating, an AC exciting voltage is applied between the ends of the sensor element which is bridged by a discharge resistor whose resistance is much lower than the internal resistance of the sensor element so as to discharge any polarization caused by asymmetry of the voltage supply through an external path, other than through the internal electrolyte. A signal output is taken from a midpoint of the sensor element which is always immersed in the electrolyte so that the effect of any leakage current is minimized. Linearity of output with change in the tilt angle achieved with an illustrative embodiment has been measured at better than 99.9% in the tilt angle over the range of −50 to +50 degrees as compared with commercially available devices whose linearity is no better than 99%.

BRIEF DESCRIPTION OF THE DRAWING

The foregoing and other features of the invention may become more apparent when the following description is read together with the drawing, in which:

FIG. 1 shows a schematic view of an illustrative embodiment of the invention;

FIG. 2 shows a side, cross-sectional view of the embodiment of FIG. 1;

FIG. 3 is an isometric view of an exemplary container for the embodiment of FIG. 1;

FIG. 4. is an isometric view of the substrate forming the cover of the container of FIG. 3 which has imprinted thereon a thick film resistive sensor element and electrodes;

FIG. 5 show the embodiment of FIG. 1 subjected to a tilt angle of α;

FIG. 6 is a plan view of an alternative embodiment of a substrate having an imprinted resistive element and electrodes suitable for measuring small tilt angles;

GENERAL DESCRIPTION

Figure 8:
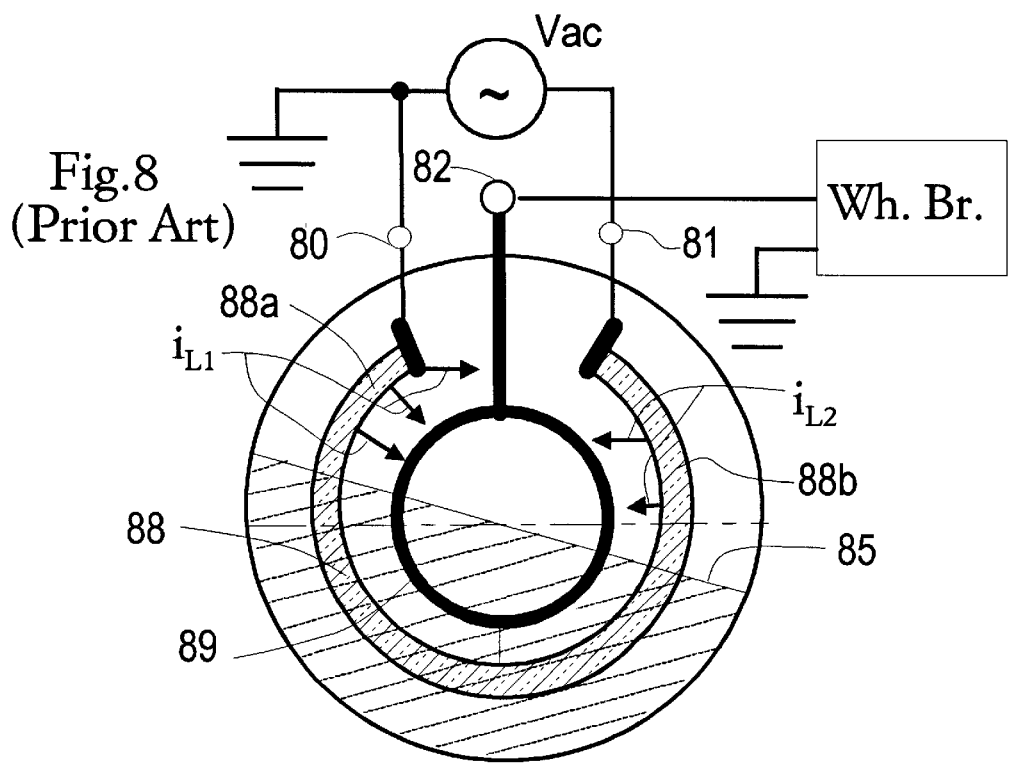
FIG. 8 shows how leakage currents occur in prior art devices which employ a partially submerged hoop electrode to maintain contact with the electrolyte.
Figure 7:
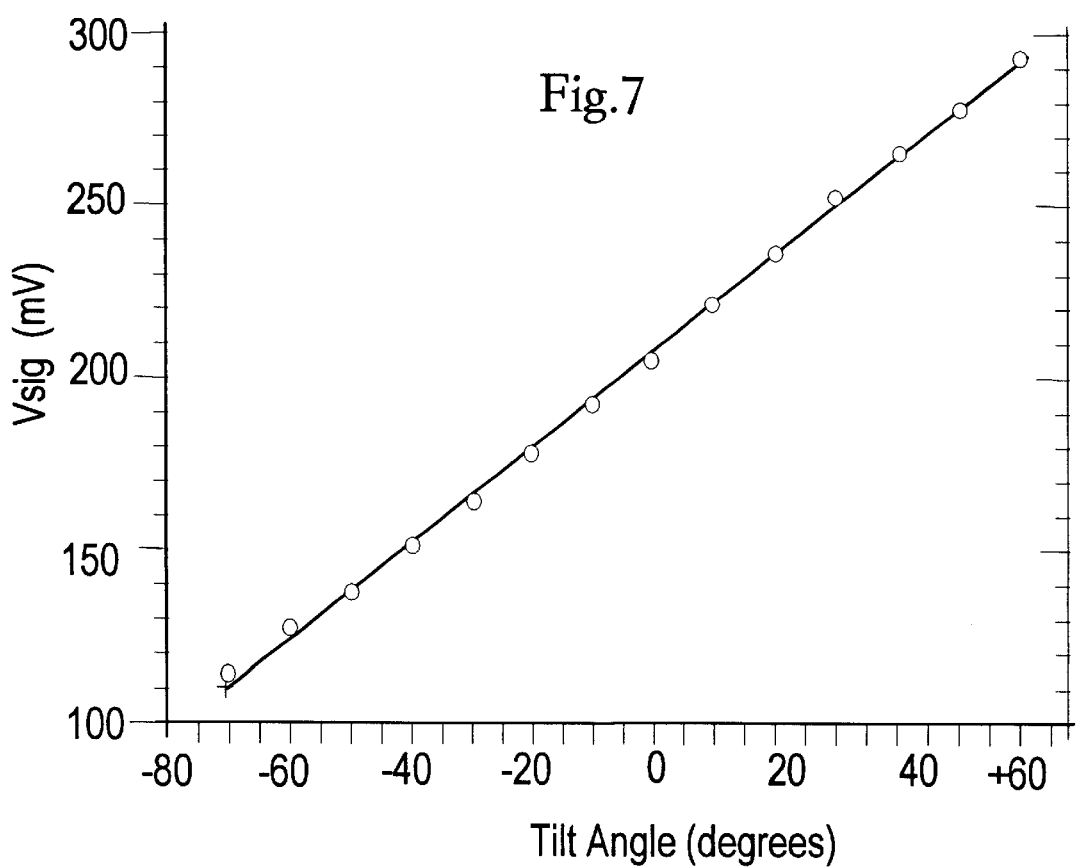
FIG. 7 is a plot illustrating the linearity of angular measurement of the invention.

Referring first to FIG. 8 there is shown a typical prior art tilt angle measuring device that employs a hoop-shaped electrode 89, such as shown in the above-mentioned Cantarella patent U.S. Pat. No. 4,167,818 or Kent patent U.S. Pat. No. 4,672,753. While electrode 89 maintains continuous contact with the electrolyte as the apparatus is tilted because a part of it is always immersed in the electrolyte, this construction does not minimize the effect of leakage currents when the exciting voltage is applied between terminals 80 and 81 at the ends of an arcuate resistive element 88. As the apparatus is tilted, the liquid electrolyte wets different portions of the arcuate element 88 and of the internal surfaces of the housing by direct contact or vaporization. Unfortunately, surface porosity in the micron range is sufficient to cause adsorption of the electrolyte, giving rise to surface leakage currents $i_{L1}$, and $i_{L2}$ from unwetted parts 88a and 88b of the resistive element 88, respectively, to the hoop electrode 89. The closer the liquid level 85 approaches one of the terminals, the larger the surface leakage current from the unwetted part of the resistive element 88 near this terminal and the smaller the leakage current from another unwetted part of the resistive element 88. As a result, the surface leakage current causes non-linearity in the measurement of resistance change with tilt angle. And while use of an AC exciting voltage reduces the polarizing effect that a DC exciting voltage would have, most AC supplies display some asymmetry between the positive and negative halves of the sine wave. This asymmetry gives rise to the likelihood that a net charge will remain between the ends of the sensing element, especially after the exciting voltage has been applied for a longer time, thereby allowing the sensing element to be electroplated with ions from the electrolyte. The plated-out ions produce polarization, i.e., additional voltage, which varies with time while the exciting AC voltage is being applied. As a result, the output signal from terminal 82 is a voltage composed of both tilt signal and time-dependent polarization. Such polarization, known as the battery effect, degrades the linearity and the scale factor of measurement.

The apparatus depicted in FIG. 1 is intended to alleviate or eliminate the prior art problems arising from leakage currents and from electroplating arising from the asymmetry of the voltage source. FIG. 1 schematically illustrates a tilt angle indicating apparatus which includes a container 10 (see FIGS. 2 and 3) defining a cylindrical cavity 11 for containing an electrolytic fluid 12. Electrolytic fluid 12 may be, for example, a 1% silver nitrate solution dissolved in a mixture of methanol, water and butanol. The cylindrical cavity 11 of the container may advantageously be formed as a receptacle of suitable depth in a dense (i.e., low porosity), stable, non-conductive material such as an alumina block 10, FIG. 3, which is inert with respect to electrolytic fluid 12. The open end of cavity 11 is sealed against leakage of electrolyte 12 by a flat cover 13, FIGS. 2 and 4. The diameter of cavity 11 is preferably to be much larger than the depth of the cavity so that the sensor will not be sensitive to tilt on an axis that is not perpendicular to the plane of cover 13. Electrolytic fluid 12 is injected through the hole 25 which is later sealed, advantageously with a chemically stable expoxy.

Cover 13, which advantageously may also be of ceramic, provides a substrate upon which is imprinted a generally circular, thick film, resistive sensing element 15. Also imprinted on cover 13 are electrodes 16, 17 and 19 which contact the lefthand end, righthand end and mid-point of resistive element 15. Conductors 20, 21 and 22 are brought out through sealable recesses 22, 23 and 24 in block 10 to provide electrical connection of the external circuitry to electrodes 16, 17 and 19 respectively. The sintering after imprinting a thick film resistor element 15 on a ceramic substrate 13 is typically carried out at a much higher temperature than that at which silver electrodes 16, 17 and 19 would be fired and so would typically be accomplished first. On the other hand if higher temperature gold or platinum electrodes were used, it might be preferable to imprint and fire the electrodes before the resistive element 15. Resistive element 15 should be uniform, dense, chemically stable throughout the range in which the sensor is to operate and be of suitable resistivity which offers as low as possible a contact resistance with the fluid 12. Contact resistance between element 15 and fluid 12 may be improved by doping into the thick film resistor 15 a small amount of the metal, which is the same element as of the charge carriers (cations) in the electrolytic fluid 12. Advantageously, in an illustrative embodiment, approximately 3% silver was so doped. However such doping of the thick film resistor 15 markedly decreases its resistivity and so compromise may be necessary. In any event, the resistivity of the portion of the thick film 15a, 15b which is above the level of fluid 12 should be much higher than that of the fluid. It should be appreciated that the larger the diameter of the resistor 15, the more accurate the sensor will be.

Figure 9:
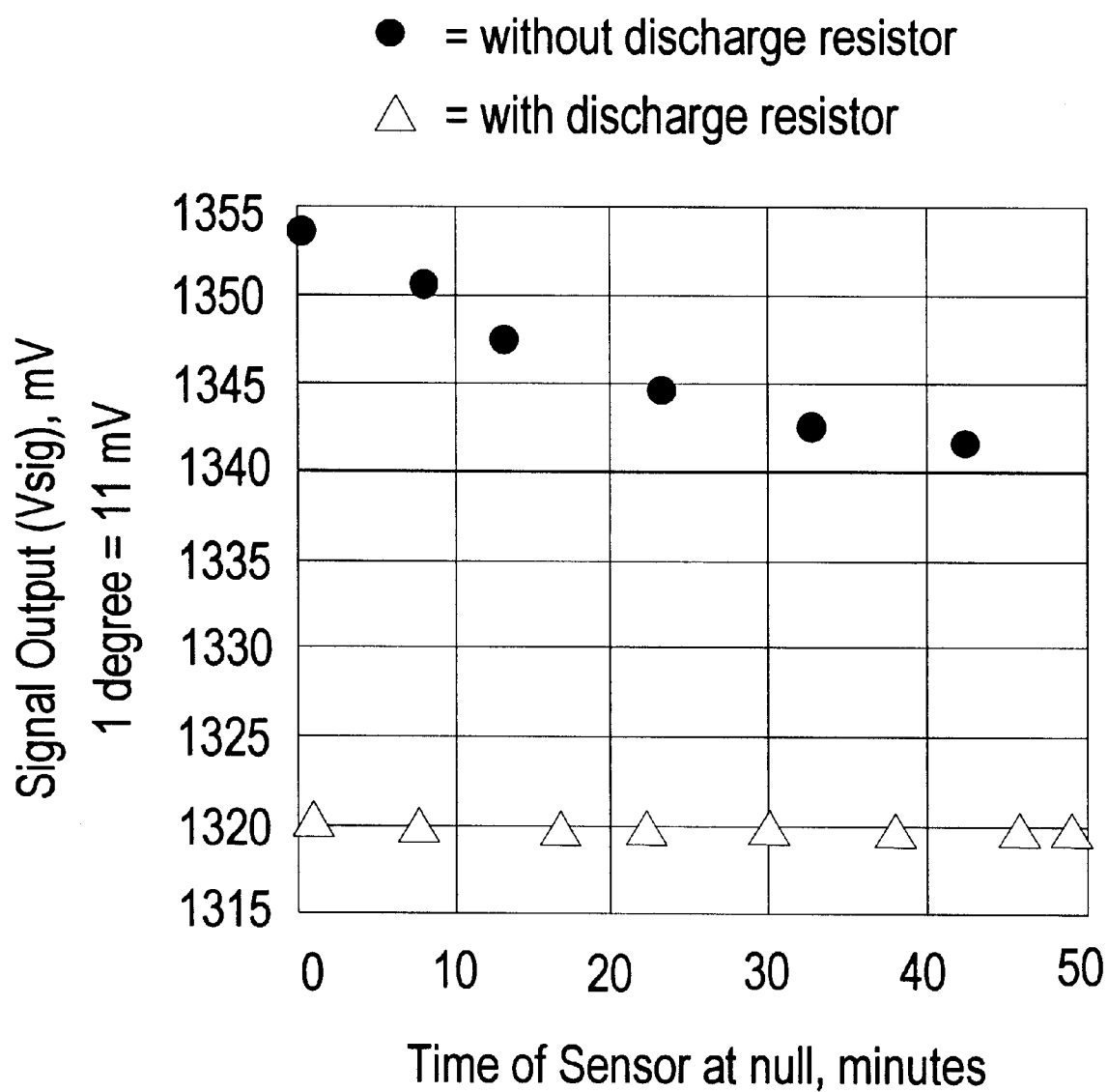
FIG. 9 compares the stability of the output signal with time with and without the discharge resistor.

FIG. 9 contrasts the stability of the output with and without the discharge resistor. When the discharge resistor is not used there is a steady decline in output while when the discharge resistor is used the polarization effect is substantially eliminated and the output remains constant at null state.

Fluid 12 partially fills the cylindrical cavity 11 up to the imaginary "equator" line 12a, thereby dividing resistive element 15 into portions 15a and 15b that are not immersed in fluid 12. FIG. 5 shows the apparatus of FIG. 1 rotated through a tilt angle a which causes the arc lengths of the "dry" portions 15a' and 15b', i.e., the portions of element 15 above the level of liquid 12, to be different from the dry arc lengths depicted in FIG. 1. The change in the relative arc lengths from 15a to 15a' and from 15b to 15b' measure the tilt angle α. The maximum operation tilt range of the apparatus depends on the shortest one of the arc lengths between an imaginary "equator" 12a and terminal 19 or the arc length between the line 12 and terminal 16 or terminal 17.

More particularly, as long as the resistance of fluid 12 is much lower than the resistance of the resistive elements 15a, 15b, fluid 12 acts much like the wiper arm of a potentiometer. Accordingly, with an alternating voltage Vac applied at terminal 16, FIG. 1, the output signal appearing at terminal Vsig is given by:

$$V_{sig} = \frac{V_{ac} Z_B}{Z_A + Z_B}, \tag{1}$$

where $V_{ac}$ is the exciting AC voltage, $Z_B$ is the impedance of the annular resistor 15b given by:

$$Z_B = Z_{B_0} + k\alpha, \tag{2}$$

and $Z_A$ is the impedance of annular resistor 15a is given by:

$$Z_A = Z_{A_0} + k\alpha, \tag{3}$$

where $Z_{B_0}$ is and $Z_{A_0}$ are the impedances of annular resistors 15b and 15a, respectively, at null tilt angle (α=0); k is a constant at a certain temperature and α is the tilt angle. As a result, the signal from the sensor is:

$$V_{sig} = \frac{V_{ac}(Z_{B_0} + k\alpha)}{Z_{A_0} + Z_{B_0}}. \tag{4}$$

The discharge resistor 30 discharges any polarization ("battery effect") voltage caused by asymmetry of the exciting voltage causing plating out of ions from the electrolyte on to the electrodes. The discharge path provided by the discharge resistor 30 is an external path which replaces the internal path provided by the electrolyte. When the discharge resistor 30 is not present, the only discharge path for the polarized electrodes is that provided internally by the electrolyte itself and such polarization not only changes the output voltage but also may seriously damage the sensor.

What has been described is deemed to be illustrative of the principles of the invention. It should be noted that instead of silver nitrate, potassium iodide (KI) and other electrolytes may be employed. In addition, it may also be especially advantageous to "dope" some of the same metal powder into the thick film resistor as is employed in the metal cations of the electrolyte. Further and other modifications may be made by those skilled in the art without, however, departing from the spirit and scope of the invention.

What is claimed is:

1. An inclination sensor for use with an AC exciting voltage source which may have an asymmetrical waveform, comprising:
   a. a low-porosity ceramic body defining a closed chamber which is partially filled with a quantity of electrically-conductive liquid, said body having at least one flat wall;
   b. an arcuate resistive element disposed on said wall, said element having electrodes at each end thereof and an electrode at its midpoint, said midpiont electrode and a portion of said resistive element being immersed in said fluid; said end electrodes being adapted for connection to said AC exciting voltage source; and
   c. a discharge resistor connected between said end electrodes, said discharge resistor having a resistance lower than the resistance of said arcuate element to prevent polarization of said element by said electrolyte, whereby the variation in resistance observable between said third electrode and one of said end electrodes varies linearly with the angle through which said ceramic body is rotated.

2. An electrical inclination sensor according to claim 1 wherein a principal portion of said arcuate resistive element is a sector of a circle.

3. An electrical inclination sensor according to claim 2 wherein said arcuate resistive element is a thick film.

4. An electrical inclination sensor according to claim 3 wherein said thick film is imprinted upon a wall of said ceramic body.

5. An electrical inclination sensor according to claim 3 wherein said conductive liquid is silver nitrate dissolved in a mixture of methanol and butanol.

6. An electrical inclination sensor according to claim 1 wherein said discharge resistor has a resistance lower than the portion of said resistive element not immersed in said liquid.

7. An electrical inclination sensor according to claim 6 wherein said discharge resistor has a resistance which is higher than the output resistance of the exciting voltage source.

8. An electrical inclination sensor according to claim 1 wherein said electrically-conductive liquid is an electrolyte having a metallic cation and wherein said arcuate resistive element includes a doping of the same metal cation as contained in said electrolyte.

9. In an electrical inclination sensor employing electrodes at least partially immersed in a fluid electrolyte which displaces an entrapped gas bubble when tilted, the combination including a discharge resistor connected between the ends of said electrodes not immersed in said electrolyte, said discharge resistor having a resistance lower than the resistance of said electrolyte and adapted to compensate for the battery effect caused by plating out of ions from said electrolyte.

10. The combination of claim 9 in which the resistance of said discharge resistor is lower than the resistance of the portion of said electrodes immersed in said electrolyte.

* * * * *